Jan. 2, 1934.    T. C. COSTELLO    1,941,538
CONTAINER FOR ICED CAKE
Filed Aug. 2, 1932
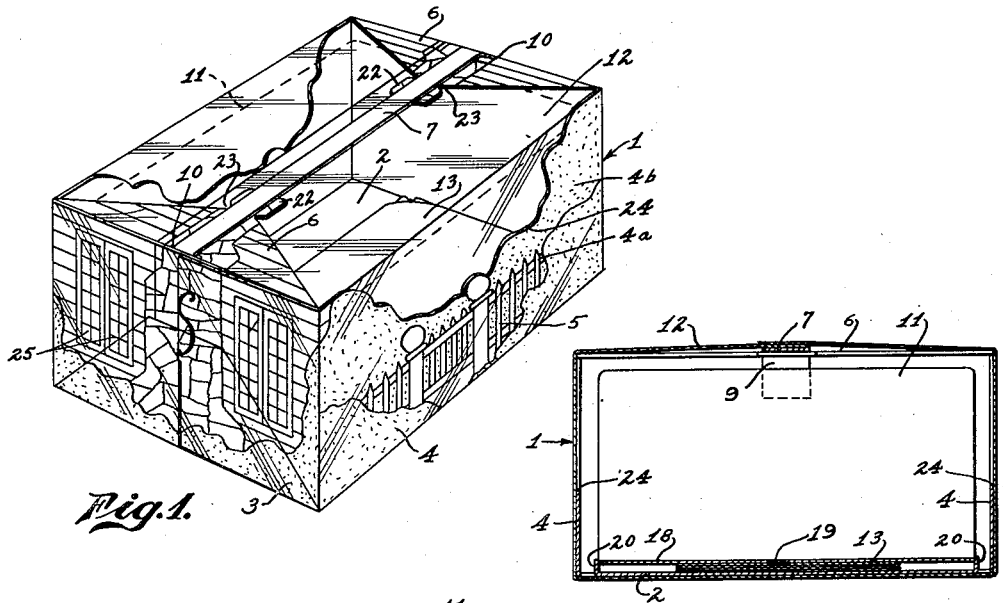
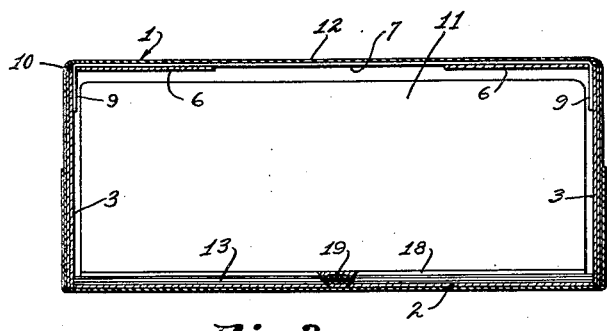
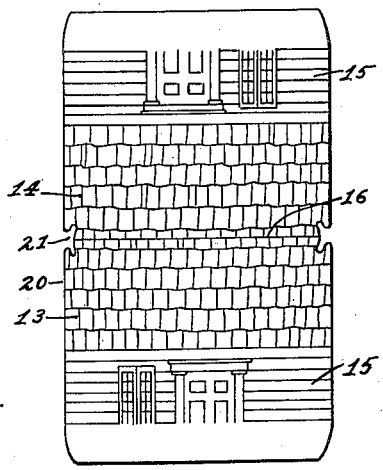
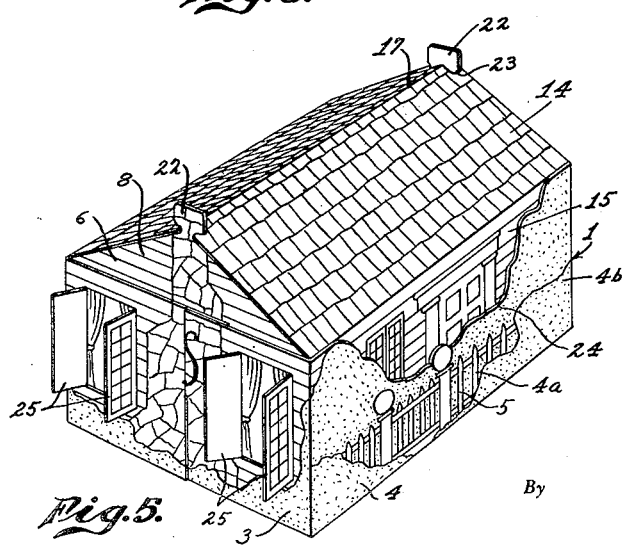
Inventor
Thomas C. Costello
By Lyon & Lyon
Attorneys Patented Jan. 2, 1934

1,941,538

UNITED STATES PATENT OFFICE 1,941,538

CONTAINER FOR ICED CAKE

Thomas C. Costello, Beverly Hills, Calif., assignor to Western Bakeries Corporation, Ltd., Los Angeles, Calif., a corporation of California Application August 2, 1932. Serial No. 627,257

5 Claims. (Cl. 206—44)

This invention relates to a container intended to be used for holding an iced cake. Such cakes are usually sold in a box which is open above so as to expose the cake to view. Frequently, the icing on the cake is soft and for this reason it is difficult to wrap the box with the cake within it without having the wrapper touch the icing. It is also a fact that the sale of such cakes in boxes is influenced somewhat by the attractiveness of the box.

The general object of this invention is to produce a container for this purpose of attractive appearance and which is provided with special means for preventing the wrapper from coming into contact with the icing on the cake.

A further object of this invention is to produce a container provided with means which enable it to be set up after the cake is removed, into a small house representing a doll house.

A still further object of the invention is to provide means for holding the cake against shifting in the box or container.

Further objects of the invention will appear hereinafter.

The invention consists of novel parts and combinations of parts to be described hereinafter, all of which contribute to produce an efficient container for iced cake.

A preferred embodiment of the invention is described in the following specification, while the broad scope of the invention is pointed out in the appended claims.

In the drawing—

Figure 1 is a perspective of a container embodying my invention and representing the same with a transparent wrapper applied to it;

Figure 2 is a vertical cross section through the container and indicating the outline of the cake within the container;

Figure 3 is a longitudinal section through the container, certain parts being broken away, and further illustrating the construction;

Figure 4 is a plan of a carton which rests on the bottom of the container and which supports the cake within the container; this view shows this carton in a flat or developed position; and Figure 5 is a perspective illustrating the doll house which can be produced from the container after the cake has been removed, employing the carton shown in Figure 4 as a roof for the house.

Referring more particularly to the parts, 1 indicates a container of box form having a bottom 2 and vertical side walls 3—3 and 4—4. In the present instance, this box is of rectangular form so that it presents parallel opposite walls. The side walls of the box are ornamented to represent the side walls of a house, that is, the walls may be formed of several colors, such as the colors 4a and 4b, one color representing shrubbery and the other colored so as to represent a fence 5. Two opposite walls of the box, preferably the end walls 3—3, are provided at their upper edges with integral flaps 6, and these flaps are adapted to be bent down into a substantially horizontal position so that they project inwardly over the interior of the box. The end walls are connected by a bar 7, which, like the rest of the box, is formed of cardboard. The bar and the end walls 3 are constructed with means for enabling the bar to be attached in a horizontal position preferably overlying the end flaps 6. The flaps 6 are of triangular form as shown, so as to enable them to form the gable 8 at each end of the house. In order to mount the bar in position, I prefer to provide the ends of the bar with a downwardly disposed extension 9, these extensions being received in slots 10 formed respectively in each end wall at or adjacent to the dihedral angle 11 where the flap 6 unites with the body of the end wall.

When the cake 11 is in place, the bar extends across above it, and enables the wrapper, such as a cellophane wrapper 12, to be applied to the box, without coming in contact with the icing on top of the cake.

In order to keep the cake from shifting on the bottom 2 of the box, I provide a folded carton 13 which has sufficient length to enable it to lie longitudinally in the box with its ends adjacent to the inner faces of the end walls 3. The carton 13 is preferably colored to represent a roof 14 of the completed house, and is provided with side flaps 15 integral with the roof that will complete the side walls of the house when set up. The carton is therefore of symmetrical form, and is provided with a central longitudinal creased line 16, which, when folded, forms the ridge 17 of the roof.

The cake 11 is supported on a rectangular base 18 of cardboard which has the same dimensions as the cake so that the edge of the cardboard 18 will act as a guide in scraping off excessive icing on the sides of the cake. The cardboard base 18 is preferably secured to the upper side of the folded carton 13 by a dab 19 of mucilage or other adhesive. The bottom 2 of the box is preferably provided with punched-out tabs 20 which are folded up into a vertical position (see Figure 2) to engage the edges of the base 18 to assist in preventing the shifting of the cake in either direction.

Suitable interlocking means is provided for interlocking the flaps 6 with the roof 14 formed from the body of the carton 13. For this purpose, the end edges 20 of the carton blank (see Figure 4) are provided with under-cut notches 21 located at the folding line 16, and the flaps 6 are provided with central tongues 22 respectively, which are provided with notches 23 on the side edges to interlock with the under-cut notches 21 as indicated in Figure 5. The upper edges of the side walls are preferably cut down as indicated at 24 in Figure 5 to expose the flaps 15 that represent parts of the side walls of the house; in other words, the side flaps 15 of the roof are adjusted into a vertical position back of the colored areas 4b. The areas 4b are colored to represent shrubbery and this attains the effect of having the side wall of the house visible over the top of this shrubbery.

If desired, the end walls of the house may be provided with integral flaps 25 to fold outwardly and which are painted to represent shutters (see Figure 5).

An effective and useful container is formed having the features of the invention, and at the same time a doll house may be set up by children of a family, from the empty cake box.

It is understood that the embodiment of the invention described herein is only one of the many embodiments this invention may take, and I do not wish to be limited in the practice of my invention, nor in my claims, to the particular embodiment set forth.

What I claim is:

1. A container for an iced cake, comprising a box having a bottom and side walls including an opposite pair of side walls with integral flaps projecting toward each other in a substantially horizontal position over the interior of the box, a bar separate from said flaps extending over the interior of the box, said flaps having means for securing the ends of said bar adjacent the upper edges of said opposite walls, said bar constituting a support to maintain a wrapper applied to the box, out of contact with the icing on the cake.

2. A container for an iced cake, comprising a box having a bottom and side walls including an opposite pair of side walls with integral flaps projecting toward each other in a substantially horizontal position over the interior of the box, said opposite pair of side walls each having a slot adjacent the upper edge thereof, a bar extending over the interior of the box with its ends extending through the said slots, said bar constituting a support to maintain a wrapper applied to the box, out of contact with the icing on the cake.

3. A container for an iced cake, comprising a box having a bottom and side walls including an opposite pair of side walls with integral flaps projecting toward each other in a substantially horizontal position over the interior of the box, said opposite pair of side walls each having a slot therein adjacent the upper edge of the wall, a bar extending over the interior of the box above the said integral flaps and having downwardly bent extensions passing through said slots respectively, said bar operating as a support to maintain a wrapper applied to the box, out of contact with the icing on the cake.

4. A container for an iced cake, comprising a box having a bottom and side walls including an opposite pair of side walls with integral flaps projecting toward each other in a substantially horizontal position over the interior of the box, a bar extending over the interior of the box with its ends secured adjacent the upper edges of said opposite walls, said bar constituting a support to maintain a wrapper applied to the box, out of contact with the icing on the cake, said flaps being of triangular form to represent gables of a house, and a folded carton lying on the bottom of the box adapted to be set up to form a roof for the box to enable the box to represent a house after the cake is removed, said carton and said flaps having interlocking means for securing the roof in place.

5. A container for an iced cake, comprising a box having a bottom and side walls including an opposite pair of side walls with integral flaps projecting toward each other in a substantially horizontal position over the interior of the box, a bar extending over the interior of the box with its ends secured adjacent the upper edges of said opposite walls, said bar constituting a support to maintain a wrapper applied to the box, out of contact with the icing on the cake, said flaps being of triangular form to represents gables of a house, and a folded carton lying on the bottom of the box adapted to be set up to form a roof for the box to enable the box to represent a house after the cake is removed, said carton having a longitudinal crease for forming the ridge of the roof, the ends of said carton having notches and said flaps having extensions with notches therein to interlock with the first named notches to secure the roof on the house.

THOMAS C. COSTELLO.